June 20, 1939. M. T. SASSOON ET AL 2,163,292
SAFETY DEVICE FOR MOTOR VEHICLES
Filed Aug. 27, 1937
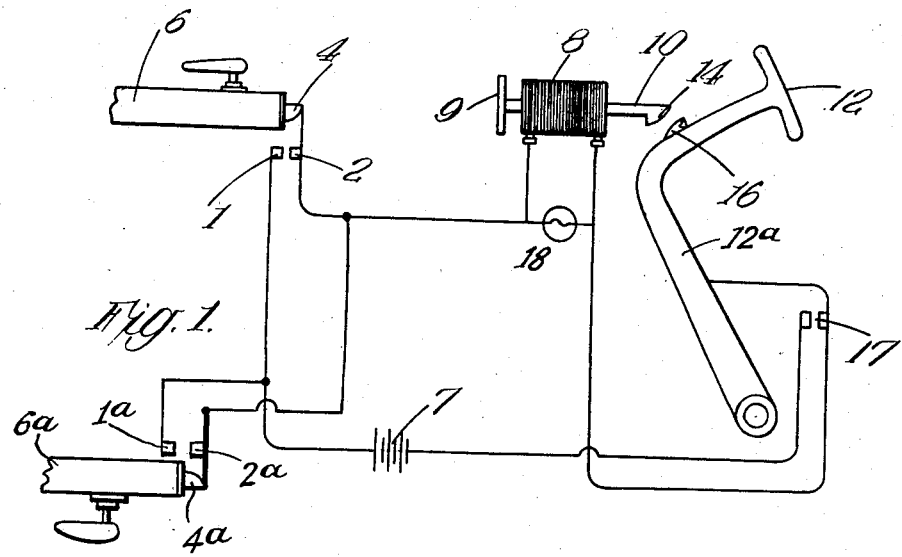
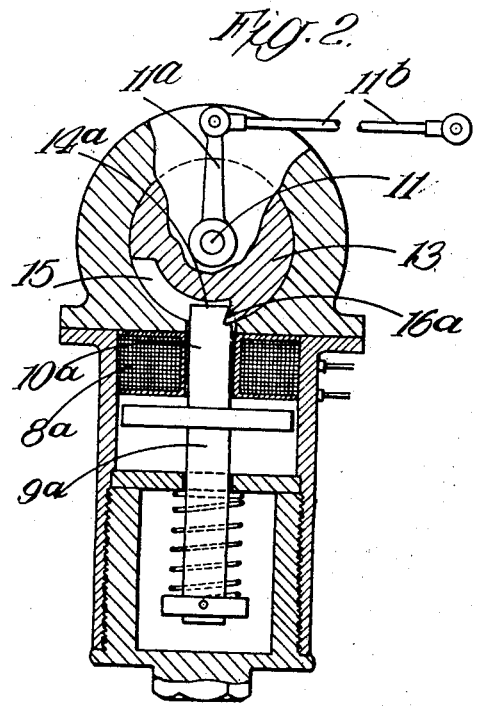
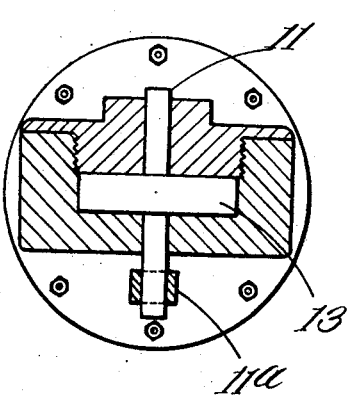
Michael Thornycroft Sassoon
Ernest Thomas Worsell
INVENTORS
their ATTY.

Patented June 20, 1939

2,163,292

UNITED STATES PATENT OFFICE 2,163,292

SAFETY DEVICE FOR MOTOR VEHICLES

Michael Thornycroft Sassoon and Ernest Thomas Worsell, Kent, England

Application August 27, 1937, Serial No. 161,292
In Great Britain February 10, 1937

2 Claims. (Cl. 180—82)

This invention relates to vehicles, and especially to motor road vehicles, provided with outwardly-opening hinged doors, and has for its object the provision of a safety device adapted to prevent the vehicle from being driven away before all the doors are securely closed. A device for this purpose according to the invention comprises electrical contacts associated with a door and adapted to be separated only by complete closure of the latter, such contacts being in circuit with electromagnetic stop means adapted, when energised, to prevent completion of the depression-and-return movement of the clutch or equivalent pedal employed in starting the vehicle from rest.

Where, as is usual, the vehicle has more than one door, the various pairs of contacts associated respectively therewith will be connected in parallel at a point in the general energising circuit of the stop means. Also, the latter is preferably arranged to prevent the return movement of the pedal, rather than depression thereof, so as to avoid any possibility of damage being caused to the arrangement by forcible attemps to overcome its action.

The invention is illustrated in the accompanying drawing wherein:

Figure 1 is a diagrammatic representation of the various parts and their electrical connection in one embodiment of the invention.

Figure 2 is a sectional view of the solenoid and locking unit according to a second embodiment of the invention, and Figure 3 is a cross section at right angles of Figure 2.

In one contemplated practical form of the invention, as applied to a saloon motor car, a pair of spring contacts 1, 2 is accommodated in each door pillar and is so constructed and positioned as to be separable only by the complete entry of the door catch 4 into its recess in the pillar when the door 6 is fully closed. The various pairs of contacts 1, 2; 1a, 2a for different doors 6, 6a are wired together in parallel, and the system is inserted in a circuit including the car battery 7 and an electromagnetic latch device, now to be described, associated with the clutch withdrawal mechanism.

The latch device comprises a suitable solenoid 8 disposed in horizontal position whose axially sliding armature 9 is formed into or carries a bolt 10 directed towards the arm 12a of the clutch pedal 12. The arm 12a carries an abutment member 16 which is arranged to be engaged by the head 14 of the sliding bolt 10 when the solenoid is energised and the clutch pedal 12 has been depressed to engage a gear.

The clutch pedal 12 is thus prevented from rising until the door 6 has been firmly shut. In order, however, to prevent the car from being suddenly started by the mere closure of the door in these circumstances, the bolt head 14 and the abutment 16 against which it is bearing are somewhat undercut, so that the bolt 10 is prevented from dropping, even when its solenoid has been de-energised until the driver returns to his seat and bears with his foot on the depressed clutch pedal 12.

Preferably a master switch 17 is incorporated in the solenoid circuit and closed by the initial part of the depression of the pedal 12, so that the car may stand for periods with one or more doors ajar without involving a continuous drain on the battery. Additionally or alternatively, such a master switch may be operated by the ignition switch of the car.

In all cases a visible warning light 18 may be wired up in circuit with the solenoid to provide an independent indication to the driver that an attempt is being made to drive away with one or more doors insecurely shut.

In the embodiment of the invention illustrated in Figs. 2 and 3, the solenoid 8a is arranged in substantially vertical position and the bolt 10a is directed radially upwards towards a cross shaft 11 which is connected by crank 11a and link 11b to the clutch pedal and is rotated by depression thereof. The shaft 11 carries an abutment in the form of a disc 13 against the periphery of which the head 14a of the sliding bolt 10a bears when the solenoid 8a is energized. The periphery of the disc 13 is formed with a recess 15 into which the bolt head 14a may enter and fit loosely, the recess 15 being so positioned, that this occurs when the clutch pedal is depressed to engage a gear, assuming, of course, that a door has been left ajar and the energizing circuit of the solenoid thereby completed. When the clutch pedal is released, the disc 13 returns to its initial position and the undercut head 14a of the armature 9a is latched in an undercut portion 16a of the recess 15, where it is held even after interruption of the solenoid circuit, until it is released by renewed pressure on the clutch pedal.

We claim:

1. In a vehicle having a door, and a pedal to be first depressed and then released for starting the vehicle, a movable abutment, electromagnetic means for bringing said abutment into an operative position stopping return of the depressed pedal to its released position, an energizing circuit for said electromagnetic means including a switch controlled by said door, and means to retain said pedal in said stopped position after deenergization of said electromagnetic means until the pedal is subsequently depressed.

2. In a vehicle having a door, and a pedal to be first depressed and then released for starting the vehicle, an abutment moving with said pedal, a second movable abutment, electromagnetic means for bringing said second abutment into an operative position allowing depression of said pedal but preventing complete release thereof by engagement with said first mentioned abutment, an energizing circuit for said electromagnetic means including a switch controlled by said door, the mutually contacting faces of said abutments being undercut to prevent their subsequent disengagement except by renewed pressure on said pedal.

MICHAEL THORNYCROFT SASSOON.
ERNEST THOMAS WORSELL.